United States Patent [19]
Ziolkowski

[11] Patent Number: 4,644,507
[45] Date of Patent: Feb. 17, 1987

[54] SCALING OF SOUND SOURCE SIGNATURES IN UNDERWATER SEISMIC EXPLORATION

[76] Inventor: Antoni M. Ziolkowski, Noordeinde 12, 2611, KH Delft, Netherlands

[21] Appl. No.: 589,105

[22] PCT Filed: Jun. 24, 1983

[86] PCT No.: PCT/GB83/00159
§ 371 Date: Feb. 28, 1984
§ 102(e) Date: Feb. 28, 1984

[87] PCT Pub. No.: WO 84/00215
PCT Pub. Date: Jan. 19, 1984

[30] Foreign Application Priority Data

Jun. 28, 1982 [GB] United Kingdom ............... 8218691

[51] Int. Cl.⁴ .......................... G01V 1/13; G01V 1/40
[52] U.S. Cl. .......................... 367/23; 367/56; 367/144; 181/118; 181/120
[58] Field of Search .............. 367/16, 21, 23, 56, 367/59, 142, 144; 181/110, 111, 115, 118, 120

[56] References Cited

U.S. PATENT DOCUMENTS

| | | | |
|---|---|---|---|
| 3,866,161 | 2/1975 | Ban et al. | 367/56 |
| 4,326,271 | 4/1982 | Ziolkawski et al. | 367/16 |
| 4,467,459 | 8/1984 | Carrie | 367/23 |
| 4,476,550 | 10/1984 | Ziolkawski | 367/23 |
| 4,476,553 | 10/1984 | Ziolkawski et al. | 367/144 |
| 4,500,978 | 2/1985 | Ziolkawski et al. | 367/144 |

FOREIGN PATENT DOCUMENTS 2048480 12/1980 United Kingdom ............... 367/23

OTHER PUBLICATIONS

Ziolkawski, "A Method for Calculating ... Air Gun", 1970, pp. 137–161, Geophys. J. R. Astr. Soc. 1, vol. 21.
Ziolkawski, "Design of a Marine Seismic ... Sound Source", 1971, Geophys. J. R. Astr. Soc., vol. 23.
Ziolkawski, "Source Array Scaling ... Decanvalution", 12/80, pp. 902–918, Geophys. Pros., vol. 28, #6; Abst. Provided.
Ziolkawski, "Wavelet Decanvalution ... Scaling Law", pp. 872–901, 12/80, pp. 872–901, Geophys. Pros. vol. 28, #6 Abst. Prov.

Primary Examiner—Nelson Moskowitz
Attorney, Agent, or Firm—Parmelee, Miller, Welsh & Kratz

[57] ABSTRACT

The invention relates to a method of determining the location in the earth of sub-surface boundaries and/or the acoustic properties of sub-surface features substantially in the absence of the far field source wavelet and noise and with errors due to reflections of sound waves from the water being substantially compensated for. The invention uses point sound sources or arrays thereof at a first depth and then scales the energy, pressure and spacing of a similar source at a second depth to provide data which is used to obtain a seismic record.

14 Claims, 7 Drawing Figures

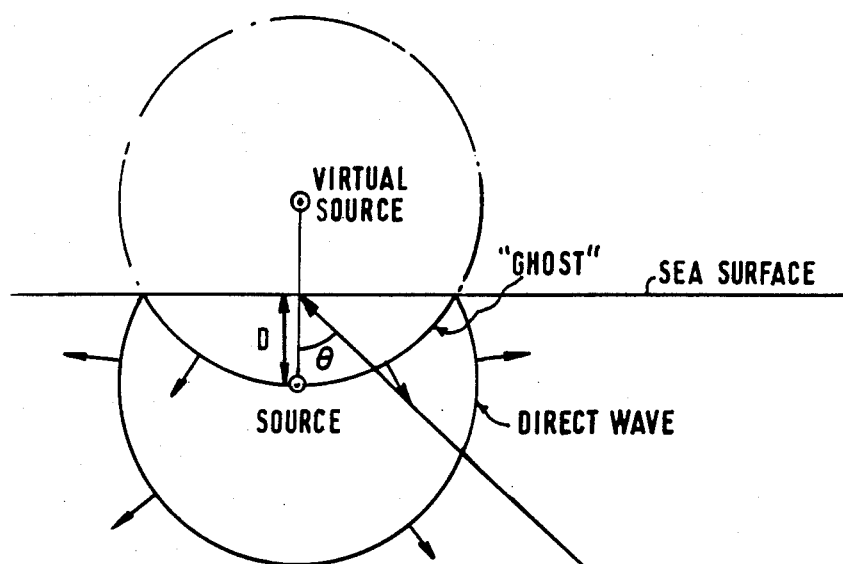
FIG. 1.
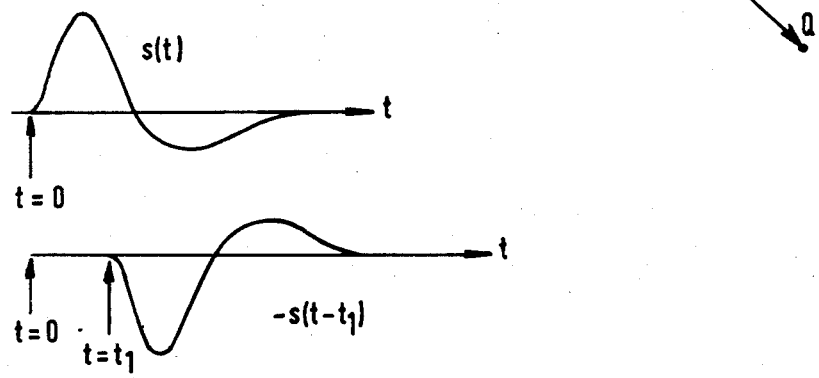
FIG. 2.
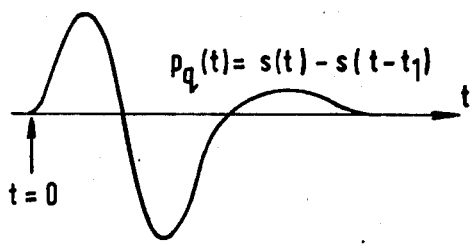

SCALING OF SOUND SOURCE SIGNATURES IN UNDERWATER SEISMIC EXPLORATION

This invention relates to the scaling of sound source signatures in underwater (e.g. marine) seismic exploration. The present invention extends and improves the inventions described and claimed in British Patent Applications Nos. 8013438 (Ser. No. 2048481) and 8013437 (Ser. No. 2048480) U.S. Pat. No. 4,500,978 and U.S. Pat. No. 4,326,271, respectively in the name of Antoni Marjan Ziolkowski. The present Application relates in particular to sound sources having the special feature of controllable initial firing pressure, e.g. air guns, which is necessary for the utilization of this invention.

In U.S. Pat. No. 4,500,978, the contents of which are incorporated herein by reference, it is proposed that the seismic method be applied twice in each place, with both the shot and receiver positions unchanged, but with the second shot a scaled version of the first shot. In the two received seismograms $x_1(t)$ and $x_2(t)$, the earth impulse response $g(t)$ is the same, because the positions of shot and receiver are unchanged. However, the two source signatures $s_1(t)$ and $s_2(t)$ are different and are shown to be related to each other by a source scaling law. Thus there are three unknown quantities $s_1(t)$, $s_2(t)$ and $g(t)$ which are related by the three equations:

$$x_1(t) = s_1(t) * g(t) \tag{1}$$

$$x_2(t) = s_2(t) * g(t) \tag{2}$$

$$x_2(t) = \alpha s_1(t/\alpha) \tag{3}$$

where the asterisk denotes convolution and the scale factor $\alpha$ is defined as the relation $$\alpha = \left[ \frac{\text{Energy in source 2}}{\text{Energy in source 1}} \right]^{\frac{1}{3}} \tag{4}$$

Equations (1) and (2) neglect noise. These equations may be solved to obtain $s_1(t)$, $s_2(t)$ and $g(t)$ from the measurements $x_1(t)$ and $x_2(t)$, by a robust method described in the above Application, which method is stable in the presence of noise. The point of the invention of that Application is that previous technology was able to provide only one equation, like equation (1) containing two unknowns. There has always been a chronic problem of determining $g(t)$ precisely in the absence of accurate information about $s_1(t)$. Repeating the experiment, as U.S. Pat. No. 4,500,978 proposes, would not make sense without the additional information provided by the scaling law, equation (3).

For this scaling law to apply, the only parameter which can be changed is the size of the point source. For example, if explosives are used at sea, the chemical composition must be the same for source 1 and source 2; the depths below the sea surface must also be the same; only the sizes are different and are related by $\alpha$ (thus the mass of the second explosive is $\alpha^3$ times the mass of the first). If air guns are used, their volumes must differ by a factor $\alpha^3$, but the depths and firing pressures must be the same.

In the U.S. Pat. No. 4,326,271, the idea was extended to two-dimensional arrays of point sources, with air gun arrays as an example. It was proposed that each point source element in one scaled array be simply a scaled version of the corresponding element in the other array. That is, the ratio of the energies of the corresponding elements of array 2 to array 1 is $\alpha^3$ (obeying equation 4). The dimensions of the two arrays correspondingly scale by a factor $\alpha$; thus the horizontal dimensions of array 2 are $\alpha$ times those of array 1. No other parameters are changed. The depths are the same; and the pressures (of air guns) or chemical compositions (of explosives) are the same, in these conditions equation (3) relates the waves $s_2(t)$ and $s_1(t)$ which would be generated at a given distance and in a given direction from the two scaled arrays. This is fully explained in U.S. Pat. No. 4,326,271, the contents of which are incorporated herein by reference.

Problems with the Two Previous Applications

There are two problems with the solutions of previous applications which both concern the "ghost reflection" from the sea surface.

Problem 1

The "ghost reflection" is the reflection of the sound wave by the surface. In the case of a marine seismic source the sea acts like a mirror which a reflection coefficient of almost exactly $-1$. It has the effect of creating a virtual seismic source whose sound wave is of opposite polarity to the real source, as shown in FIG. 1. The sound wave which reaches the point Q is the sum of both waves: the direct wave from the source and the reflected wave or "ghost" which appears to originate from the virtual source.

It is convenient to think of the wave generated by any source as the sum of its own direct wave and its ghost reflection.

In our conception of the seismogram described by equations (1) and (2) we have treated this ghost reflection as separate from the source wavelet $s_1(t)$ or $s_2(t)$. We have treated it as belonging to $g(t)$. Thus, when we take out $s_1(t)$ from equation (1) we find $g(t)$ which includes this ghost. Similarly when we take out $s_2(t)$ from equation (2) we find another estimate of $g(t)$ which includes this ghost. Thus we have created a situation in which $g(t)$, as we have defined it, is not the impulse response of the earth, but the response to two impulses in two different places. The first impulse occurs at the position of the source at time $t=0$. The secnd one occurs at the same time but appears to come from the virtual source and has opposite polarity. In order to find the true impulse response we must remove this second "ghost response" which is very inconvenient. It would be much more convenient if the $s_1(t)$ in equation (1) and the $s_2(t)$ in equation (2) represented the full wave, including the ghost. This cannot be the case, with the existing applications, because *the ghost does not scale.*

We may see this with reference to FIGS. 1 and 2. FIG. 2 shows the direct wave $s(t)$ and its "ghost" $-s(t-t_1)$ arriving at the point Q. The sum of these two waves is $$P_Q(t) = s(t) - s(t - t_1), \tag{5}$$

where the time delay $$t_1 = 2D \cos \theta, \tag{6}$$

and the minus sign occurs because the sea surface has a reflection coefficient of almost exactly $-1$. When we have two different sources at the same depth, the direct waves $s_1(t)$ and $s_2(t)$ scale, as in equation (3), but the ghost delay $t_1$ does not change and therefore the sum of the direct wave plus the ghost does not scale. This is illustrated in FIG. 3.

Problem 2

We have been discussing the source and its virtual image, or ghost, as if they were almost independent. Of course the ghost is totally dependent on the source and the surface, as we know. However, the source is not entirely independent of its own ghost: there is a kind of feed-back effect which is not completely negligible.

In the case of an air gun, for example, the sound wave is generated by the oscillations of the bubble produced by the gun. Referring to FIG. 4, we see that there is a pressure difference between the inside of the bubble and the pressure outside, that is, hydrostatic pressure. Initially the internal pressure is typically about 135 atmospheres, whereas hydrostatic pressure is about 2 atmospheres. The bubble therefore rapidly expands against the water, overshoots the equilibrium position at which the internal and external pressure are equal, slows down and then stops. The bubble has now reached its maximum size and the internal pressure is less than hydrostatic pressure. The pressure difference now acts inwards. The bubble collapses, and the collapse is halted only by the rapid build-up of pressure inside the bubble. At this point the oscillation is ready to begin again. It is these bubble oscillations, pushing the water around, which are the source of the sound waves (in much the same way as loudspeakers are effective sound sources by their ability to push air around).

Now the ghost reflection is a pressure wave which travels past the oscillating bubble. It is a pressure disturbance superimposed on ambient pressure. That is, it adds a dynamic term $p_g(t)$ to the static pressure in the water $P_H$. The water pressure at the bubble is thus not constant, it varies with time as:

$$P_w(t) = P_H + p_g(t), \quad (7)$$

where $P_w(t)$ is the total pressure in the water at time t, $P_H$ is the hydrostatic pressure and $p_g(t)$ is the dynamic term due to the ghost reflection. In normal operation $p_g(t)$ is small compared with $P_H$, so $P_w(t)$ is fairly constant. Nevertheless the effect does exist and is not negligible.

In the case where we have scaled air guns—either point sources or arrays—$P_H$ will be the same for both. However, since $p_g(t)$ is the reflection of the wave generated by the source, it will be different for scaled sound sources and therefore $P_w(t)$ is different for scaled sound sources. It follows that the dynamics of the bubble oscillations will be different for the scaled sources, and the scaling law, equation (3), will not be obeyed exactly.

BRIEF DESCRIPTION OF THE DRAWINGS

FIG. 1 illustrates the effect of a ghost reflection of a sound wave by the surface of a sea surface;

FIG. 2 is an illustration of a direct wave s(t) and its "ghost" $-s(t-t_1)$ arriving at a point Q;

Figure 3:
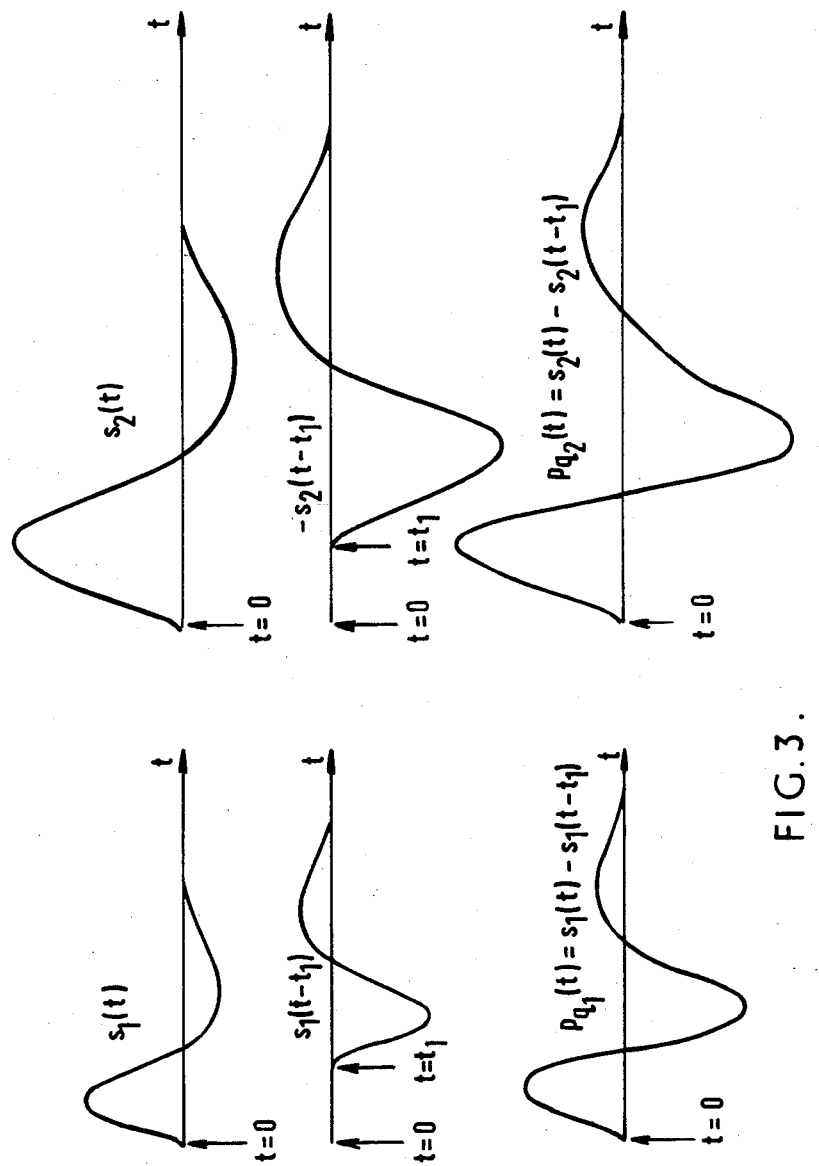
FIG. 3 is an illustration of the effect of two different sources at the same depth wherein the direct waves $s_1(t)$ and $s_2(t)$ scale, but the ghost delay $t_1$ does not change, such that the sum of the direct wave plus the ghost does not scale.
Figure 4:
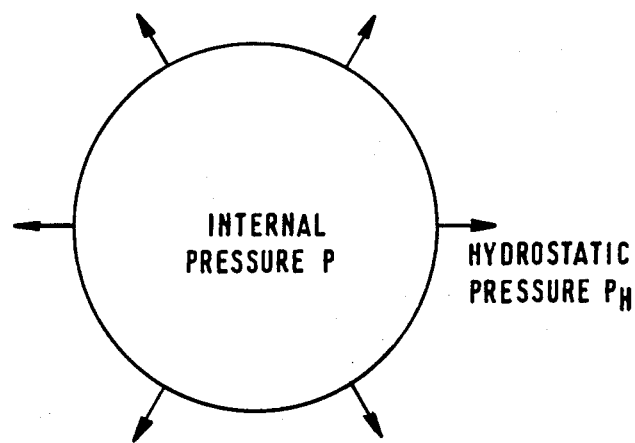
FIG. 4 is a representation of a pressure difference between the inside of a bubble and the pressure outside, i.e., the hydrostatic pressure.

The present invention has as its object the partial or complete solution to both these problems.

Present Invention

The essence of the present invention is to scale the depth of source 2 such that it is equal to $\alpha$ times the depth of source 1, where $\alpha$ is the time scale factor desired for signature scaling (see equation (3)), whilst maintaining essentially the same dynamical properties of the scaled source at the scaled depth.

According to the present invention there is provided a method of determining the location in the earth of sub-surface boundaries and/or the acoustic properties of sub-surface features in the earth, which method includes (a) employing at a selected location and at a predetermined depth in water a first sound source to generate a first sound wave having elastic radiation of predetermined energy and at a predetermined initial pressure, and, subsequently, employing a second sound source of the same type as said first sound source at the same location but at a second and different predetermined depth in water to generate a second sound wave having elastic radiation of a second and different predetermined energy and at a second and different predetermined initial pressure, the depths, energies and initial pressures being selected such that the energy of the elastic radiation emitted by the second source is greater by a factor $\alpha^3 \cdot \beta^{3/2}$ than that emitted by the first source and that the frequency spectra of the respective sound waves overlap, that the depth $D_2$ of the second source is greater by a factor $\alpha$ than the depth $D_1$ of the first source, and that the initial pressure $P_2$ of the sound wave emitted by the second source is related to that $P_1$ of the sound wave emitted by the first source by the equation:

$$P_2 = \beta^{\frac{1}{2}}[P_1 + P_{H1}(\beta^{\frac{1}{2}} - 1)],$$

wherein $P_{H1}$ represents the hydrostatic pressure at the first source, $P_{H2}$ represents hydrostatic pressure at the second source, and $$\beta = \frac{P_{H2}}{P_{H1}};$$

(b) detecting by means of one or more receivers, reflections from within the earth of the sound waves to generate respective first and second seismic signals and (c) subjecting these signals to analysis and comparison to derive the impulse response of the earth substantially in the absence of the far field source wavelet and noise and with errors due to reflections of the sound wave from the water surface being substantially compensated for.

The terms "selected location" and "same location" as used herein define locations below a selected surface coordinate of the seal in which the seismic exploration is to be effected. The predetermined depth and second different predetermined depth in the water thus refer to depths below the selected surface coordinate.

The first and the second sound sources can each be point sound sources or can each be an array of mutually interacting point sound sources. In the latter case the array forming the second source should contain the same number and type of point sound sources as that of the first source, and in the same spatial relationship although the spacing between individual point sound sources of the array of the second source should be scaled by the factor $\alpha$ with respect to the corresponding spacing of the array of the first source. The point sound sources of an array should all lie at a common depth.

Suitable values for $\alpha$ and $\beta$ are from 1.1 to 3, preferably from 1.5 to 3.

It is generally necessary that the initial firing pressure of the guns be adjustable in order that the pressure relationships defined hereinbefore are satisfied; the use of air guns as the point sound sources is accordingly preferred although other sources the initial pressure of which is adjustable may be used.

In the case of an air gun source, there are two parameters which can be varied once the depth has been fixed: the initial internal pressure, or firing pressure, and the gun volume. Now, the gun volume does not affect the dynamics to any large extent. In fact, as we have described, whenever the volume is varied and the depth and pressure are maintained constant, the sound wave maintains the same shape apart from the scaling described by equation 3, in which $\alpha$ is equal to the cube root of the volume ratio. This scaling is a simple expression of the constant dynamics of the oscillating bubble, with the scale factor relating only to the size of the bubble and not to the dynamics. There is a small volume-dependent feedback effect due to the ghost, as described above (under Problem 2), which affects the dynamics slightly. But it is otherwise true that the volume has no effect on the bubble dynamics.

Apart from the feedback effect, the bubble dynamics depend only on the depth and internal pressure. Once the depth has been fixed, the internal pressure is the only parameter which can be varied to compensate for the varying conditions. As described above, it is the pressure *difference* across the bubble wall which causes the bubble oscillations and consequent radiated sound wave. Thus the internal pressure of the bubble must be scaled appropriately to the change in hydrostatic pressure if the dynamics are to be maintained.

It can be shown by a rigorous analysis of the dynamics of the oscillating bubbles, that scaling can be achieved for arrays of air guns including the interaction between guns, and between guns and their ghosts, provided the following assumptions are made:

(1) Each bubble produced by an air gun must be small compared with the wavelength of sound generated. This is an experimental fact for airguns operating under normal conditions.

(2) The fraction of the total available energy which is converted into seismic waves is the same for any two scaled sources. This is exactly the same assumption as that required by U.S. Pat. No. 4,500,978.

The *condition* which must be satisfied in order to achieve source scaling is that the ghost interaction must scale. Under these conditions we can achieve exact scaling for point sources and arrays of point sources. We explain first the point source scaling, and then the array scaling.

Point source scaling (Air Guns)

Consider an air gun of volume $V_1$, initial firing pressure $P_1$, and depth $D_1$.

We wish to fire a gun of certain volume $V_2$ at the depth $D_2$ with initial pressure $P_2$ such that the sound wave generated by the second gun *and* its ghost is a scaled version of the sound wave generated by the first gun and *its* ghost.

The time scale factor $\alpha$ must be the same as the depth ratio. Thus $$\frac{D_2}{D_1} = \alpha \qquad (8)$$

The hydrostatic pressures at the two guns are $$P_{H1} = P_o + \rho g D_1 \qquad (9)$$

$$P_{H2} = P_o + \rho g D_2 \qquad (10)$$

where $P_o$ is atmospheric pressure, $\rho$ is the density of water and g is the acceleration due to gravity. We let the ratio of hydrostatic pressures be $\beta$:

$$\frac{P_{H2}}{P_{H1}} = \beta \qquad (11)$$

and note that, since $D_2$ and $D_1$ are related by equation (8), $\beta$ is not independent of $\alpha$. Exact scaling occurs if both the volume and initial firing pressure rations are chosen properly.

Assume that the scaled sources can each be thought of as a notional spherical oscillating bubble, at depths $D_1$ and $\alpha D_1$ respectively, with hydrostatic pressures $P_{H1}$ and $\beta P_{H1}$ (Equ 11) respectively and with internal and external pressures $P_1(t)$, $P_2(\alpha t)$ and $P_{w1}(t)$, $P_{w2}(\alpha t)$ respectively. When these two notional bubbles obey the same dimensionless equation of motion their radii are related as:

$$R_2(\alpha t) = \alpha \beta^{\frac{1}{2}} R_1(t) \qquad (12)$$

Therefore, when t=0, we know $$R_2(O) = \alpha \beta^{\frac{1}{2}} R_1(O). \qquad (13)$$

Since the bubble volume V is related to the radius by $$V = 4/3 \pi R^3, \qquad (14)$$

it follows that the ratio of the initial volumes of the two notional bubbles is:

$$V_2/V_1 = \alpha^3 \beta^{3/2}. \qquad (15)$$

The pressure differences across the walls of the scaled bubbles are related by equation (16):

$$P_2(\alpha t) - P_{w2}(\alpha t) = \beta^{\frac{1}{2}}[P_1(t) - P_{w1}(t)] \qquad (16)$$

Therefore, when t=0, we find $$P_2(O) - P_{H2} = \beta^{\frac{1}{2}}[P_1(O) - P_{H1}] \qquad (17)$$

or $$P_2(O) = \beta^{\frac{1}{2}}[P_1(O) + P_{H1}(\beta^{\frac{1}{2}} - 1)] \qquad (18)$$

We can simply transfer the relations obtained from the linear notional bubble to the nonlinear real bubble. That is, the ratio of depths and hydrostatic pressures remain as for the linear bubble, but so do the ratios of initial bubble volumes, equation (15) and pressures, equation (17).

Figure 5:
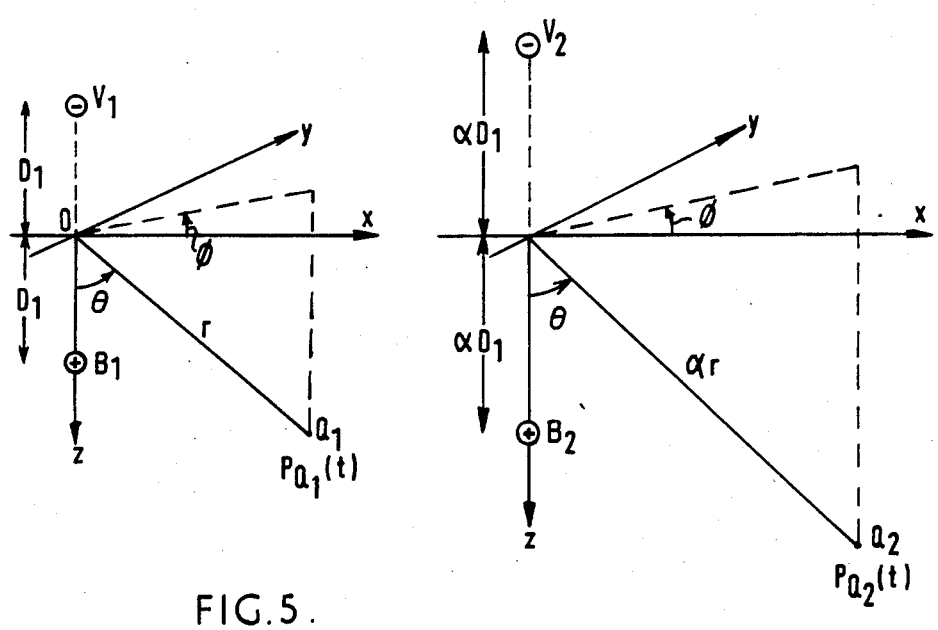
FIG. 5 illustrates a signal $P_Q(t)$ received at a point Q, at coordinate position $(\gamma, \theta, \phi)$ relative to a first gun, as related to a signal $P_Q(t)$ received at a corresponding point $Q_2$ at coordinate position $(\alpha\gamma, \theta, \phi)$ relative to a second gun.

Under the relationships of equations (15) and (17) the wavefield generated by the second gun is a scaled version of the wavefield generated by the first gun. Referring to FIG. 5, we see that the signal $P_{Q1}(t)$ received at a point $Q_1$ at coordinate position $(r, \theta, \phi)$ relative to the first gun, is related to the signal $P_{Q2}(t)$ received at the corresponding point $Q_2$ at coordinate position $(\alpha r, \theta, \phi)$ relative to the second gun. The relationship between $P_{Q2}(t)$ and $P_{Q1}(t)$ is then:

$$P_{Q2}(\alpha t) = \beta P_{Q1}(t) \tag{19}$$

If the distance r is large compared with the dimensions of the source and its ghost—that is, if r is large compared with $2D_1$:

$$r >> 2D \tag{20}$$

—then the shape of the sound wave does not alter with increasing distance. But, because the wavefront area increases as the wave propagates further from the source, the amplitude decreases inversely proportional to the distance r. The region in which this criterion is satisfied is known as the "far field" of the source, where "the source" in this case consists of the air gun *and* its ghost considered as a unit. When this far field condition is satisfied we may write $$P_{Q1}(t) = \frac{1}{r} s_1\left(\theta, \phi, t - \frac{r}{c}\right) \tag{21}$$

and $$P_{Q2}(\alpha t) = \frac{1}{\alpha r} s_2\left(\theta, \phi, \alpha t - \frac{\alpha r}{c}\right) \tag{22}$$

where c is the speed of sound and the $\theta$ and $\phi$ specify the direction of the signal as shown in FIG. (5). Putting delayed time $$\tau = t - \frac{r}{c} \tag{23}$$

we find the scaling law for the far field radiaion of our depth-scaled point sources as:

$$s_2(\theta, \phi, \alpha\tau) = \alpha\beta s_1(\theta, \phi, \tau) \tag{24}$$

Or, more simply, in a given direction from our sources, defined by the angles $\theta$ and $\phi$, the far field signatures at a given distance are related by the equation $$\left.\begin{array}{l} s_2(\alpha\tau) = \alpha\beta s_1(\tau) \\ \text{or} \\ s_2(\tau) = \alpha\beta s_1(\tau/\alpha) \end{array}\right\} \tag{25}$$

This scaling is very similar to the one used for the point source scaling. The only difference is the factor $\beta$ which arises from the need to maintain the dynamics of the oscillations of the bubbles the same at different hydrostatic pressures. The factor $\beta$ is the ratio of the hydrostatic pressures.

Array scaling

Figures 6, 7:
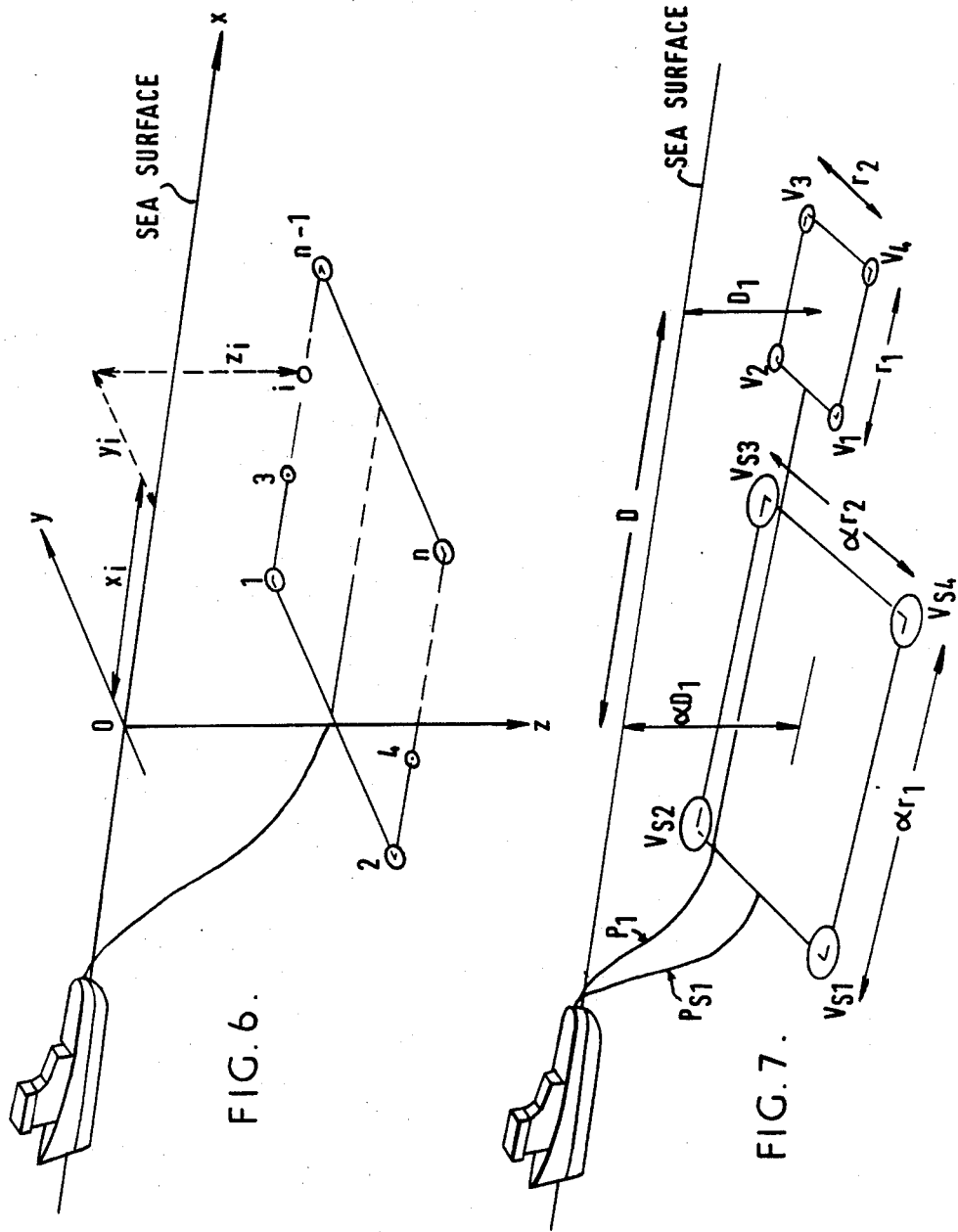
FIG. 6 illustrates an application of an array of n air guns such that the ith gun in the array has volume $V_1$, initial firing pressure $P_1$ and coordinates $(X_1, Y_1, Z_1)$.
FIG. 7 illustrates an application of the arrays of FIG. 6, as they might look in practice.

Consider an array of n air guns such that the ith gun in the array has volume $V_i$, initial firing pressure $P_i$ and coordinates $(x_i, y_i, z_i)$, as shown in FIG. 6. The depth coordinate is referred to the water surface and, for scaling to be possible, must be the same for all guns in the array. Thus $$z_1 = z_2 = z_3 = \ldots = z_n = Z \tag{26}$$

The guns in the array may fire at different preselected times $$t_1, t_2, t_3, \ldots t_n. \tag{27}$$

(Of course, when the guns has been designated to fire simultaneously the firing times are equal:

$$t_1 = t_2 = \ldots = t_n$$

but this is not a necessary condition for scaling).

We now wish to create a scaled air gun array such that the wavefield generated by this array and its ghost is a scaled version of the wavefield generated by the first array and its ghost. There are interactions between the guns in an array in exactly the same way as there is interaction, or feedback, between a single air gun and its own ghost. To ensure scaling of the interactions we must scale the dimensions of the array. If we use a subscript s to denote the scaled array and choose $\alpha$ as our time stretch factor, as before, we find the coordinates of the ith gun of the scaled array are $(x_{si}, y_{si}, z_{si})$, where $$\left.\begin{array}{l} x_{si} = \alpha x_i \\ y_{si} = \alpha y_i \\ z_{si} = \alpha z_i = \alpha z \end{array}\right\} \tag{28}$$

The hydrostatic pressure at each gun in the scaled array is:

$$P_{Hs} = P_o + \alpha\rho g z = \beta P_H \tag{29}$$

$$P_H = P_o + \rho g z \tag{30}$$

Scaling of the elements in the array follows from the rules for scaling of single air guns:

The volumes of the n guns in the scaled array are:

$$V_{si} = \alpha^3 \beta^{3/2} V_i, \quad i = 1, 2, \ldots, n \tag{31}$$

The initial firing pressures are:

$$P_{si} = \beta^{\frac{1}{2}}[P_i + P_H(\beta^{\frac{1}{2}} - 1)], \quad i = 1, 2, \ldots, n \tag{32}$$

and the firing times of the guns are $$t_{si} = \alpha t_i \tag{33}$$

FIG. 7 shows how the arrays might look in practice. As in U.S. Pat. No. 4,326,271 the arrays could be towed one behind the other and separated by a distance D equal to a multiple of the receiver group interval, such that receiver positions for the second, scaled array are the same as for the first array. It is also possible to use more than one first array and more than one second scaled array, providing the arrays are not so close as to interact with each other. If interaction occurs between any two such first arrays, they should be treated as a single array, and the second scaled array designed according to the criteria described above.

If more than one non-interacting arrays is employed, then the same number of arrays should be employed for both the second and first sound source, with each of those of the second source being scaled as described hereinbefore, relative to the corresponding arrays of the first sound source. The arrays may be fired simultaneously to produce the desired sound waves or they may be fired one after the other and the seismic signals which are generated then summed to produce the desired seismic signal. A combination of consecutive and simultaneous firings may also be employed.

Once the arrays are built, usage is exactly as described in the two previous U.S. Pat. Nos. 4,500,978 and 4,326,271, except that the scaling law contains the extra depth-dependent scale factor $\beta$:

$$s_2(\tau) = \alpha \beta s_1(\tau/\alpha) \tag{35}$$

The importance of this whole scaling law method lies in two factors. First, it is not necessary to make any assumptions about the phase spectrum of $s_1(t)$ or $s_2(t)$ or to assume anything about the statistical properties of the earth impulse response $g(t)$. Secondly, it is not necessary even to *measure* $s_1(t)$ or $s_2(t)$ provided the sources are scaled correctly. The earth impulse response may be calculated in any azimuth directly from the data collected from the two independent shot records and the scaling law.

As in U.S. Pat. No. 4,326,271 and U.S. Pat. No. 4,500,978, it is to be understood that the elastic energy will normally be detected and measured as particle velocities or sound pressures using respectively any suitable geophone or a hydrophone.

What is claimed is:

1. A method of determining the location in the earth of sub-surface boundaries and/or the acoustic properties of subsurface features in the earth, which method includes
   (a) employing at a predetermined depth in water below selected surface coordinates a first sound source to generate a first sound wave having elastic radiation of predetermined energy and at a predetermined initial pressure, and, subsequently, employing a second sound source of the same type as said first sound source at a second and different predetermined depth in water below said selected surface coordinates to generate a second sound wave having elastic radiation of a second and different predetermined energy and at a second and different predetermined initial pressure, the depths, energies and initial pressures being selected such that
   the energy of the elastic radiation emitted by the second source is greater by a factor $\alpha^3 \cdot \beta^{3/2}$ than that emitted by the first source and that the frequency spectra of the respective sound waves overlap,
   that the depth $D_2$ of the second source is greater by a factor $\alpha$ than the depth $D_1$ of the first source, and
   that the initial pressure $P_2$ of the sound wave emitted by the second source is related to that $P_1$ of the sound wave emitted by the first source by the equation:

$$P_2 = \beta^{\frac{1}{2}}[P_1 + P_{H1}(\beta^{\frac{1}{2}} - 1)],$$

wherein $P_{H1}$ represents the hydrostatic pressure at the first source, $P_{H2}$ represents hydrostatic pressure at the second source, and $$\beta = \frac{P_{H2}}{P_{H1}}$$

(b) detecting by means of one or more receivers, reflections from within the earth of the sound waves to generate respective first and second seismic signals and
   (c) subjecting these signals to analysis and comparison to derive the impulse response of the earth substantially in the absence of the far field source wavelet and noise and with errors due to reflections of the sound wave from the water surface being substantially compensated for.

2. A method according to claim 1, wherein said first and second sound sources each constitutes a point sound source.

3. A method according to claim 1 wherein said first and second sources each comprises an array of mutually interacting point sound sources, said array of the second source containing the same number and type of point sound sources as the array of the first source and in the same spatial relationship, the spacing between individual point sound sources of the array of the second source being scaled by a factor $\alpha$ with respect to the corresponding point sound sources of the array of the first source, and the firing times for the point sound sources of the first source being scaled by the factor $\alpha$ with respect to the corresponding point sound sources of the second source, all of the point sound sources in a said array being at a common depth.

4. A method according to claim 3, wherein a first plurality of non-interacting arrays is employed as the first source, the seismic signals derived from each array being summed to generate said first seismic signal and wherein the same number of non-interacting arrays, each scaled relative to the corresponding arrays of said first plurality of arrays, is employed as the second source, the seismic signals derived from each array being summed to generate said second seismic signal.

5. A method according to claim 3, wherein a first plurality of non-interacting arrays is employed as the first source and is fired simultaneously to produce said first sound wave, and wherein the same number of non-interacting arrays, each scaled relative to the corresponding arrays of said first plurality of arrays, is employed as the second source and the said second arrays are fired simultaneously to produce said second sound wave.

6. A method according to claim 1, wherein each point sound source comprises an air gun.

7. A method according to claim 3, wherein each point sound source comprises an air gun.

8. A method according to claim 3, wherein a plurality of spaced receivers is employed and wherein said arrays are towed through the water one behind the other, at a separation which is equal to a multiple of the receiver group interval, such that receiver positions for the second scaled array are the same as for the first array.

9. A method according to claim 1, wherein $\alpha$ has a value of from 1.1 to 3.

10. A method according to claim 9, wherein $\alpha$ has a value of from 1.5 to 3.

11. A method according to claim 1, wherein $\beta$ has a value of from 1.1 to 3.

12. A method according to claim 11, wherein $\beta$ has a value of from 1.5 to 3.

13. A method according to claim 1, which produces a seismogram of the impulse response of the earth.

14. A seismogram of the impulse response of the earth when obtained by the method of claim 13.

* * * * *